United States Patent
Sato et al.

(10) Patent No.: US 9,114,895 B2
(45) Date of Patent: Aug. 25, 2015

(54) INJECTION MOLDED BODY HAVING EXCELLENT BARRIER PROPERTY

(71) Applicant: Mitsubishi Gas Chemical Company, Inc., Chiyoda-ku (JP)

(72) Inventors: Kazunobu Sato, Hiratsuka (JP); Katsuya Maruyama, Hiratsuka (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 0 days.

(21) Appl. No.: 13/858,443

(22) Filed: Apr. 8, 2013

(65) Prior Publication Data

US 2013/0219836 A1 Aug. 29, 2013

Related U.S. Application Data

(63) Continuation of application No. 13/252,302, filed on Oct. 4, 2011, which is a continuation of application No. 12/446,111, filed as application No. PCT/JP2007/070432 on Oct. 19, 2007, now abandoned.

(30) Foreign Application Priority Data

Oct. 19, 2006 (JP) ................. 2006-284766
Oct. 19, 2006 (JP) ................. 2006-284767
Feb. 19, 2007 (JP) ................. 2007-038070

(51) Int. Cl.

| C08L 77/00 | (2006.01) |
|---|---|
| B65B 1/00 | (2006.01) |
| B29C 45/00 | (2006.01) |
| B29C 45/16 | (2006.01) |
| B32B 27/08 | (2006.01) |
| B32B 27/34 | (2006.01) |
| C08L 23/02 | (2006.01) |
| C08L 51/06 | (2006.01) |
| C08L 77/06 | (2006.01) |
| B29C 49/06 | (2006.01) |
| B29C 49/12 | (2006.01) |
| B29C 49/22 | (2006.01) |
| B29K 77/00 | (2006.01) |
| C08L 23/08 | (2006.01) |
| C08L 77/02 | (2006.01) |

(52) U.S. Cl.
CPC ............... *B65B 1/00* (2013.01); *B29C 45/0001* (2013.01); *B29C 45/1642* (2013.01); *B29C 45/1684* (2013.01); *B32B 27/08* (2013.01); *B32B 27/34* (2013.01); *C08L 23/02* (2013.01); *C08L 51/06* (2013.01); *C08L 77/06* (2013.01); *B29B 2911/1402* (2013.01); *B29B 2911/1404* (2013.01); *B29B 2911/1408* (2013.01); *B29B 2911/1412* (2013.01); *B29B 2911/14026* (2013.01); *B29B 2911/14033* (2013.01); *B29B 2911/14053* (2013.01); *B29B 2911/14066* (2013.01); *B29B 2911/14093* (2013.01); *B29B 2911/14106* (2013.01); *B29B 2911/14146* (2013.01); *B29C 45/1657* (2013.01); *B29C 49/06* (2013.01); *B29C 49/12* (2013.01); *B29C 49/22* (2013.01); *B29C 2045/1648* (2013.01); *B29C 2045/1664* (2013.01); *B29K 2077/00* (2013.01); *C08L 23/0815* (2013.01); *C08L 77/02* (2013.01); *C08L 2205/02* (2013.01); *Y10T 428/31757* (2015.04)

(58) Field of Classification Search
CPC ........... B65B 1/00; C08L 23/02; C08L 51/06; C08L 77/06
USPC .................. 524/128, 414, 502, 504, 514, 515
See application file for complete search history.

(56) References Cited

U.S. PATENT DOCUMENTS

| 4,261,473 A | 4/1981 | Yamada et al. |
|---|---|---|
| 2001/0056148 A1 | 12/2001 | Sato et al. |
| 2003/0114591 A1 | 6/2003 | Sato et al. |
| 2003/0190489 A1 | 10/2003 | Mitadera et al. |
| 2004/0170787 A1 | 9/2004 | Michihata et al. |
| 2004/0230028 A1 | 11/2004 | Sato et al. |
| 2005/0038163 A1 | 2/2005 | Shindome et al. |
| 2005/0143519 A1 | 6/2005 | Maruo et al. |
| 2012/0263962 A1 | 10/2012 | Sato et al. |

FOREIGN PATENT DOCUMENTS

| CN | 1660929 A | 8/2005 |
|---|---|---|
| EP | 0 393 409 | 10/1990 |
| EP | 1 475 403 | 11/2004 |
| JP | 62 52030 | 3/1987 |
| JP | 63 078705 | 4/1988 |
| JP | 2003 291937 | 10/2003 |
| JP | 2004 292037 | 10/2004 |
| JP | 2004 352985 | 12/2004 |
| JP | 2005 008664 | 1/2005 |
| JP | 2006 131275 | 5/2006 |

OTHER PUBLICATIONS

Office Action issued Apr. 20, 2011, in Chinese Patent Application No. 200780038342.0.

*Primary Examiner* — Edward Cain
(74) *Attorney, Agent, or Firm* — Oblon, McClelland, Maier & Neustadt, L.L.P.

(57) ABSTRACT

A method of providing an oxygen barrier for a product includes placing a product in an injection molded article which includes 10 to 60% by mass of a polyamide resin (A) and 40 to 90% by mass of a mixed polyolefin (E), wherein the polyamide resin (A) includes a diamine unit 70 mol % or more of which is one or more m-xylylenediamine units and a dicarboxylic acid unit 70 mol % or more of which is one or more dicarboxylic acid units including a $C_4$ to $C_{20}$ $\alpha,\omega$-linear aliphatic dicarboxylic acid and isophthalic acid at a molar ratio of from 30:70 to 100:0, the mixed polyolefin (E) includes 40 to 100% by mass of a polyolefin (C) and 0 to 60% by mass of a modified polyolefin (B), and at least a portion of the polyamide resin (A) is dispersed in a layered state.

20 Claims, No Drawings

INJECTION MOLDED BODY HAVING EXCELLENT BARRIER PROPERTY

CROSS-REFERENCE TO RELATED APPLICATIONS

The present application is a continuation of and claims the benefits of priority to U.S. Ser. No. 13/252,302, filed Oct. 4, 2011, which is a continuation of and claims the benefit of priority to U.S. Ser. No. 12/446,111, filed Apr. 17, 2009, which is a national stage of International Application No. PCT/JP2007/070432, filed Oct. 19, 2007. The contents of these applications are incorporated herein by reference in their entireties. The International Application is based on and claims the benefits of priority to Japanese Patent Application Nos. 2006-284766, 2006-284767 and 2007-038070.

TECHNICAL FIELD

The present invention relates to injection-molded articles having excellent barrier property and appearance, etc., and more particularly to multilayer injection molded articles that are excellent in barrier property, appearance, delamination resistance, heat resistance, etc., and single-layer injection-molded articles that are excellent in barrier property, appearance, etc.

BACKGROUND ART

Injection molding has been widely spread and used in various applications such as mechanical parts, automobile parts, electric and electronic parts and containers for food and drugs because it is capable of producing molded articles having a complicated shape with a high productivity. In particular, containers for beverages, etc., have been frequently constructed from an injection molded article because a mouth portion of these containers is formed into an excellent threaded shape in order to ensure sufficient tightening of a cap thereon.

As the material for injection molding articles, there have been used various general resins including polyolefins such as polyethylene and polypropylene, polyesters and polystyrenes. Of these resins, polyolefins such as polypropylene have been extensively used in various applications such as containers because they are excellent in flowability and heat resistance upon molding as well as exhibit a light weight and a low moisture absorption and are available at low costs.

However, the polyolefins tend to be deteriorated in barrier property against gases such as oxygen and are, therefore, unsuitable as containers for preserving contents that are apt to be adversely affected by oxygen, etc., or as containers for food or drugs which are required to exhibit a good keeping property under severe environmental conditions such as high-temperature conditions. In consequence, there are disclosed methods in which a barrier material such as polyamides is blended in the polyolefins to improve a barrier property of the polyolefins (refer to Patent Documents 1 and 2).

These methods might improve a barrier property of the polyolefins to some extent. However, the barrier material to be blended must be dispersed in the polyolefins in a specific condition, so that the polyolefins tend to be improved in barrier property only to an insufficient extent. In addition, these methods also have such a problem that molded articles obtained from the resin mixture tend to have a poor appearance owing to the polyamides that are locally present near a surface thereof. More specifically, the method of the Patent Document 1 requires a biaxial stretch blow molding procedure, and the molded articles obtained without conducting the biaxial stretch blow molding procedure tend to be deteriorated in barrier property. Whereas, the Patent Document 2 discloses the composite molded article made of a polyolefin matrix and an amorphous polyamide in the form of a plurality of masses dispersed in the polyolefin, but is silent about crystalline polyamides and polyamides having a m-xylylene skeleton.

Upon producing a molded article having a multilayer structure including polyolefin layers and a barrier layer by injection molding method, since a material for the barrier layer exhibit no adhesion to the polyolefin layers, the molded article is required to have, for example, a structure having at least five layers, i.e., a layer structure of polyolefin layer/adhesive layer/barrier layer/adhesive layer/polyolefin layer. The production of the molded article having such a multilayer structure tends to be accompanied with difficulties in view of its structure and moldability and, therefore, has been rarely practiced from industrial viewpoints. In consequence, there is disclosed a method in which a polyolefin is compounded with a modified polyolefin to enhance adhesion of a polyolefin layer to a barrier layer and necessitate no adhesive layer therebetween (refer to Patent Document 3). The method of the Patent Document 3 improves adhesion between the polyolefin layer and barrier layer, but requires a large amount of the expensive modified polyolefin to ensure sufficient adhesion between these layers. In addition, this method has such a problem that the resulting molded article tends to be deteriorated in heat resistance owing to addition of the modified polyolefin thereto.

The present inventors have previously proposed the polyamide resin obtained by polycondensation of a diamine component containing 70 mol % or more of m-xylylenediamine and a mixed dicarboxylic acid component containing an α,ω-linear aliphatic dicarboxylic acid and isophthalic acid (refer to Patent Document 4). The polyamide resin exhibits an excellent barrier property. However, it has been still required that a multilayer injection molded article produced using the polyamide resin is further improved in delamination resistance.

Patent Document 1: JP 2004-292037A
Patent Document 2: JP 2005-8664A
Patent Document 3: JP 2006-131275A
Patent Document 4: JP 2004-352985A

DISCLOSURE OF THE INVENTION

Problem to be Solved by the Invention

An object of the present invention is to solve the above conventional problems encountered in containers obtained by injection molding, and provide a multilayer injection molded article that is excellent in barrier property, appearance, delamination resistance and heat resistance, as well as a single-layer injection molded article that is excellent in barrier property, appearance, etc., which is capable of being produced in an economically advantageous manner.

Means for Solving the Problem

As the result of extensive and intensive researches for achieving the above object, the present inventors have found that the object is suitably achieved by a multilayer injection molded article including a resin layer composed of a specific polyamide resin and a modified polyolefin or a resin layer composed of the polyamide resin, the modified polyolefin and the other polyamide resin as a barrier layer, or by an injection molded article in which the above specific polyamide resin is dispersed in a layered state in a mixed polyolefin. The present invention has been accomplished on the basis of the above finding.

Thus, the present invention relates to the injection molded articles as described in the following aspects.

1. An injection molded article with a multilayer structure including at least one layer of a barrier resin composition including (A) 10 to 70% by mass of a polyamide resin including a diamine constitutional unit 70 mol % or more of which is derived from m-xylylenediamine and a dicarboxylic acid constitutional unit 70 mol % or more of which is derived from a dicarboxylic acid containing a $C_4$ to $C_{20}$ α,ω-linear aliphatic dicarboxylic acid and isophthalic acid at a molar ratio of from 30:70 to 100:0; (B) 90 to 30% by mass of a modified polyolefin; and (C) 0 to 50% by mass of a polyolefin.

2. An injection molded article with a multilayer structure including at least one layer of a barrier resin composition including (A) 50 to 90% by mass of a polyamide resin including a diamine constitutional unit 70 mol % or more of which is derived from m-xylylenediamine and a dicarboxylic acid constitutional unit 70 mol % or more of which is derived from a dicarboxylic acid containing a $C_4$ to $C_{20}$ α,ω-linear aliphatic dicarboxylic acid and isophthalic acid at a molar ratio of from 30:70 to 100:0; (B) 2 to 45% by mass of a modified polyolefin; and (D) 2 to 45% by mass of a m-xylylene group-free polyamide (D).

3. An injection molded article including (A) 10 to 60% by mass of a polyamide resin including a diamine constitutional unit 70 mol % or more of which is derived from m-xylylenediamine and a dicarboxylic acid constitutional unit 70 mol % or more of which is derived from a dicarboxylic acid containing a $C_4$ to $C_{20}$ α,ω-linear aliphatic dicarboxylic acid and isophthalic acid at a molar ratio of from 30:70 to 100:0; and (E) 40 to 90% by mass of a mixed polyolefin including (C) 40 to 100% by mass of a polyolefin and (B) 0 to 60% by mass of a modified polyolefin, wherein at least a part of the polyamide resin (A) is dispersed in a layered state.

4. The injection molded article according to the above aspect 1 or 2, wherein the polyamide resin (A) has a relative viscosity of 2.5 or more as measured at 25° C. in 96% by mass concentrated sulfuric acid as a solvent with a concentration of 1 g/100 mL.

5. The injection molded article according to any one of the above aspects 1 to 3, wherein the modified polyolefin (B) is obtained by graft-modifying the polyolefin (C) with an unsaturated carboxylic acid or an anhydride thereof.

6. The injection molded article according to the above aspect 2, wherein the m-xylylene group-free polyamide (D) is an aliphatic polyamide selected from the group consisting of nylon-6, nylon-66 and nylon-666.

7. The injection molded article according to the above aspect 2, wherein the m-xylylene group-free polyamide (D) is an aliphatic polyamide having a relative viscosity of less than 5 as measured at 25° C. in 96% by mass concentrated sulfuric acid as a solvent with a concentration of 1 g/100 mL.

8. The injection molded article according to the above aspect 1 or 2, wherein the article has a multilayer structure in which the layer of the barrier resin composition is sandwiched between thermoplastic resin layers (F) each made of a polyolefin.

9. The injection molded article according to the above aspect 1 or 2, wherein the article is in the form of a multilayer stretched injection molded article obtained by subjecting a multilayer injection molded article to biaxial stretch blow molding.

Effect of the Invention

The injection molded article with a multilayer structure according to the above aspect 1 of the present invention (hereinafter occasionally referred to merely as the "multilayer injection molded article I") and the injection molded article with a multilayer structure according to the above aspect 2 of the present invention (hereinafter occasionally referred to merely as the "multilayer injection molded article II") are excellent in barrier property, delamination resistance, heat resistance and appearance. In particular, the multilayer injection molded articles I and II are prevented from suffering from delamination between a barrier resin layer and adjacent layers even when exposed to severe impact upon transportation or drop thereof, are capable of avoiding occurrence of the delamination even though they are not formed into such a shape having less irregular and flexed portions, and therefore exhibit a large freedom of design.

The injection molded article according to the above aspect 3 of the present invention (hereinafter occasionally referred to merely as the "single-layer injection molded article") is excellent in barrier property and appearance, and can be produced in an economically advantageous manner.

Therefore, the multilayer injection molded articles I and II and the single-layer injection molded article are suitably used as containers for liquid food such as beverages and soups or for food and drugs capable of being subjected to retort treatment, etc.

BEST MODE FOR CARRYING OUT THE INVENTION

The polyamide resin (A) used in the multilayer injection molded articles I and II and the single-layer injection molded article according to the present invention includes a diamine constitutional unit and a dicarboxylic cid constitutional unit in which 70 mol % or more of the diamine constitutional unit is derived from m-xylylenediamine, and 70 mol % or more of the dicarboxylic acid constitutional unit is derived from a dicarboxylic acid containing a $C_4$ to $C_{20}$ α,ω-linear aliphatic dicarboxylic acid and isophthalic acid at a molar ratio of from 30:70 to 100:0.

The multilayer injection molded articles I and II of the present invention includes at least one layer of a barrier resin composition containing the polyamide resin (A) as a main component, and preferably has such a multilayer structure in which the layer of the barrier resin composition is sandwiched between thermoplastic resin layers (E) each made of a polyolefin.

The single-layer injection molded article of the present invention has such a structure in which at least a part of the polyamide resin (A) is dispersed in a layered state in a molded body containing a polyolefin (C).

Examples of diamines other than m-xylylenediamine which may be used as a raw material for production of the polyamide resin (A) include aliphatic diamines such as tetramethylenediamine, pentamethylenediamine, 2-methyl pentanediamine, hexamethylenediamine, heptamethylenediamine, octamethylenediamine, nonamethylenediamine, decamethylenediamine, dodecamethylenediamine, 2,2,4-trimethyl-hexamethylenediamine and 2,4,4-trimethyl-hexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin (including structural isomers thereof) and bis(aminomethyl)tricyclodecane (including structural isomers thereof); and aromatic ring-containing diamines such as bis(4-aminophenyl)ether, p-phenylenediamine, p-xylylenediamine and bis(aminomethyl)naphthalene. These diamines other than m-xylylenediamine may be used in an amount of 30 mol % or less on the basis of the whole diamine components.

Examples of the $C_4$ to $C_{20}$ $\alpha,\omega$-linear aliphatic dicarboxylic acid include aliphatic dicarboxylic acids such as succinic acid, glutaric acid, pimelic acid, suberic acid, azelaic acid, adipic acid, sebacic acid, undecanedioic acid and dodecandioic acid. Of these acids, especially preferred is adipic acid.

The molar ratio of the $C_4$ to $C_{20}$ $\alpha,\omega$-linear aliphatic dicarboxylic acid to isophthalic acid in the mixed dicarboxylic acid is from 30:70 to 100:0, preferably from 30:70 to 95:5, more preferably from 40:60 to 95:5 and still more preferably from 60:40 to 90:10. When using the mixed dicarboxylic acid containing isophthalic acid in the above specified range, the resulting polyamide resin is enhanced in barrier property. In addition, the polyamide resin produced by using the mixed dicarboxylic acid not only has a lower melting point, is shaped at a lower temperature, and is therefore capable of being produced with a less energy and shortened in molding cycle, but also exhibits a higher melt viscosity and is therefore improved in moldability without occurrence of drawdown of the resin, etc., as compared to the polyamide resin produced from the $C_4$ to $C_{20}$ $\alpha,\omega$-linear aliphatic dicarboxylic acid solely.

Examples of dicarboxylic acids other than the $C_4$ to $C_{20}$ $\alpha,\omega$-linear aliphatic dicarboxylic acid and isophthalic acid which may be used as a dicarboxylic acid component of the polyamide resin (A) in the present invention include phthalic acid compounds such as terephthalic acid and orthophthalic acid; naphthalenedicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalene dicarboxylic acid, 1,8-naphthalene dicarboxylic acid, 2,3-naphthalenedicarboxylic acid, 2,6-naphthalenedicarboxylic acid and 2,7-naphthalenedicarboxylic acid; monocarboxylic acids such as benzoic acid propionic acid and butyric acid; polycarboxylic acids such as trimellitic acid and pyromellitic acid; carboxylic acid anhydrides such as trimellitic anhydride and pyromellitic anhydride.

In the polyamide resin (A) used in the present invention, the content of the constitutional unit derived from these dicarboxylic acids other than the $C_4$ to $C_{20}$ $\alpha,\omega$-linear aliphatic dicarboxylic acid and isophthalic acid is in the range of 30 mol % or less on the basis of the whole dicarboxylic acid constitutional units.

The polyamide resin (A) is produced by polycondensing a diamine component containing m-xylylenediamine in an amount of 70 mol % or more with a dicarboxylic acid component containing the mixed dicarboxylic acid composed of the $C_4$ to $C_{20}$ $\alpha,\omega$-linear aliphatic dicarboxylic acid and isophthalic acid at a molar ratio of from 30:70 to 100:0, in an amount of 70 mol % or more. The production method is not particularly limited. The polyamide resin (A) may be produced by conventionally known methods such as atmospheric melt polymerization and pressure melt polymerization.

For example, the polyamide resin (A) may be produced by heating a nylon salt produced from m-xylylenediamine and adipic acid or from m-xylylenediamine, adipic acid and isophthalic acid under pressure in the presence of water, and polymerizing the nylon salt while being kept in a molten state and removing water added and condensed water produced, from the reaction system. Alternatively, the polyamide resin (A) may be produced by directly adding m-xylylenediamine to adipic acid or a mixture of adipic acid and isophthalic acid which is kept in a molten state, and polycondensing these compounds with each other under normal pressures. In the latter method, in order to prevent the reaction system from being solidified, m-xylylenediamine is continuously added to the dicarboxylic acid component, and the polycondensation reaction therebetween proceeds while heating the reaction system to keep the reaction temperature during the addition at such a temperature not lower than melting points of oligoamides and polyamides produced.

Upon the polycondensation for production of the polyamide resin (A), lactams such as $\epsilon$-caprolactam, $\omega$-laurolactam and $\omega$-enanthlactam, amino acids such as 6-aminocaproic acid, 7-aminoheptanoic acid, 11-aminoundecanoic acid, 12-aminododecanoic acid, 9-aminononanoic acid and p-aminomethylbenzoic acid, etc., may be added to the polycondensation reaction system unless the addition thereof adversely affects the properties of the obtained polyamide resin.

The polyamide resin (A) is preferably further subjected to heat treatment after the above polycondensation to enhance a melt viscosity thereof. The heat treatment may be conducted, for example, by a method in which the polyamide resin is gently heated in the presence of water in an inert gas atmosphere or under reduced pressure using a batch type heater such as a rotary drum and crystallized while avoiding fusion thereof, followed by subjecting the resulting resin to further heat treatment; a method in which the polyamide resin is heated and crystallized in an inert gas atmosphere using a groove type stirring heater, and then the resulting resin is heat-treated in an inert gas atmosphere using a hopper-shaped heater; or a method in which the polyamide resin is crystallized using a groove type stirring heater, and then the resulting resin is heat-treated using a batch type heater such as a rotary drum. Among these methods, preferred is the method in which the crystallization and heat treatment are conducted using the batch type heater. The conditions of the treatments are preferably controlled such that the polyamide resin (A) obtained by the melt polymerization is heated from 70° C. to 120° C. over 0.5 to 4 h in the presence of water in an amount of 1 to 30% by mass based on the polyamide resin and crystallized, and then further heat-treated at a temperature of from [melting point of polyamide resin (A)-50° C.] to [melting point of polyamide resin (A)-10° C.] over 1 to 12 h in an inert gas atmosphere or under reduced pressure.

The polyamide resin (A) used in the multilayer injection molded articles I and II preferably has a relative viscosity of 2.5 or more and more preferably 3 or more as measured at 25° C. in 96% by mass concentrated sulfuric acid as a solvent with a concentration of 1 g/100 mL. When the relative viscosity of the polyamide resin (A) is less than 2.5, the polyamide resin (A) tends to be insufficient in adhesion property, thereby causing delamination of the resulting article.

The polyamide resin (A) used in the single-layer injection molded article preferably has a relative viscosity of 2.5 or less and more preferably 2.3 or less as measured under the same conditions as described above. When the relative viscosity of the polyamide resin (A) is more than 2.5, the polyamide resin (A) tends to be insufficient in barrier property.

The melting point of the polyamide resin (A) used in the multilayer injection molded articles I and II and the single-layer injection molded article of the present invention is preferably controlled to a temperature range of from 160 to 240° C., more preferably from 170 to 235° C. and still more preferably from 180 to 230° C.

Meanwhile, when the melting point of the polyamide resin (A) used in the multilayer injection molded article I is controlled to be close to the melting point of the modified polyolefin (B) or the polyolefin (C), it is possible to prevent occurrence of defects such as unevenness in thickness owing to difference in molding temperature between resins upon production of the multilayer molded article, or suppress generation of off-odor and undesirable coloration owing to deterioration of the resins.

In addition, when the melting point of the polyamide resin (A) used in the multilayer injection molded article II is controlled to be close to the melting point of the thermoplastic resin (F) used for sandwiching the layer of the barrier resin composition between layers thereof, it is also possible to prevent occurrence of defects such as unevenness in thickness owing to difference in molding temperature between resins upon production of the multilayer molded article, or suppress generation of off-odor and undesirable coloration owing to deterioration of the resins.

The glass transition point of the polyamide resin (A) is preferably in the range of from 80 to 130° C. The polyamide having a glass transition point of 80° C. or higher exhibits an excellent barrier property under a high temperature condition.

The polyamide resin (A) suitably used in the present invention has an end amino group concentration of less than 40 µ-equivalent/g, preferably from 10 to 30 µ-equivalent/g, and more preferably a carboxyl group concentration of from 40 to 100 µ-equivalent/g or more. When controlling the end amino group concentration of the polyamide resin (A) to the above specified range, the resulting barrier layer can be prevented from suffering from yellow discoloration.

The polyamide resin (A) preferably contains a phosphorus compound in order to enhance a processing stability upon melt molding or prevent undesirable coloration of the polyamide resin. As the phosphorus compound, there may be suitably used those phosphorus compounds containing an alkali metal or an alkali earth metal. Examples of the phosphorus compound include phosphates, hypophosphites and phosphites of sodium, magnesium, calcium, etc. Among these phosphorus compounds, hypophosphites of the alkali metal or alkali earth metal are preferably used because of an excellent anti-coloring effect for polyamides. The concentration of the phosphorus compound in the polyamide resin (A) is 200 ppm or less, preferably 160 ppm or less and more preferably 100 ppm or less in terms of phosphorus atom.

Meanwhile, the polyamide resin (A) may also contain, in addition to the above phosphorus compound, various additives such as lubricants, delustering agents, heat stabilizers, weather stabilizers, ultraviolet absorbers, nucleating agents, plasticizers, flame retardants, antistatic agents, anti-coloring agents and anti-gelling agents, unless the addition thereof adversely affects the aimed effects of the present invention. Further, various materials, though not particularly limited to those previously described, may be mixed in the polyamide resin (A).

The polyamide resin (A) is preferably dried before used to such an extent that a water content thereof is reduced to 0.10% by mass or less, preferably 0.08% by mass or less and more preferably 0.05% by mass or less. The polyamide resin (A) having a water content of 0.10% by mass or less is free from formation of air bubbles owing to water vapor generated therefrom upon melt-mixing with other components. The polyamide resin (A) may be dried by known methods. For example, there may be adopted such a method in which the polyamide resin (A) is charged into a heatable tumbler equipped with a vacuum pump (rotary vacuum vessel) or a pressure-reduced dryer, and heated and dried at a temperature not higher than a melting point of the polymer and preferably not higher than 160° C. under reduced pressure.

The modified polyolefin (B) suitably used in the present invention is obtained by graft-modifying the polyolefin (C) with an unsaturated carboxylic acid or an anhydride thereof.

The polyolefin (C) used in the present invention includes various polyolefins. Examples of the suitable polyolefin include homopolymers of ethylenically unsaturated hydrocarbons having 2 or more carbon atoms and preferably 2 to 8 carbon atoms such as low-density polyethylene, medium-density polyethylene, high-density polyethylene, linear low-density polyethylene, polypropylene, 1-polybutene and 1-polymethyl pentene; homopolymers of α-olefins having 3 to 20 carbon atoms; copolymers of α-olefins having 3 to 20 carbon atoms (such as ethylene-propylene copolymers, ethylene-propylene-diene terpolymers, ethylene-1-butene copolymers, ethylene-4-methyl-1-pentene copolymers, ethylene-1-hexene copolymers, ethylene-1-octene copolymers, ethylene-1-decene copolymers, propylene-1-butene copolymers, propylene-4-methyl-1-pentene copolymers, propylene-1-hexene copolymers, propylene-1-octene copolymers and propylene-1-decene copolymers); and copolymers of an α-olefin having 3 to 20 carbon atoms with a cyclic olefin (such as copolymers of an α-olefins having 3 to 20 carbon atoms with norbornene). These polyolefins may be used singly or in the form of a mixture of any two or more thereof.

Among these polyolefins, preferred are polyethylene, polypropylene, 1-polybutene, and resins having a high glass transition point such as the copolymers of an α-olefin with a cyclic olefin, and more preferred is polypropylene because it is excellent in heat resistance.

The polyolefin (C) used in the present invention preferably has a melt flow rate (MFR) of from 1 to 100 g/10 min as measured at 190° C. under a load of 2.16 kgf. When using the polyolefin (C) having a MFR of 1 g/10 min or more, the resulting molded article is free from molding defects such as unevenness in thickness.

As described above, the modified polyolefin (B) used in the present invention is obtained by graft-modifying the above polyolefin (C) with an unsaturated carboxylic acid or an anhydride thereof, and may be suitably selected from those generally extensively used as compatibilizers or adhesives.

Specific examples of the unsaturated carboxylic acid or anhydride thereof include acrylic acid, methacrylic acid, α-ethyl acrylic acid, maleic acid, fumaric acid, itaconic acid, citraconic acid, tetrahydrophthalic acid, chloromaleic acid, butenyl succinic acid and anhydrides of these acids. Among these acids and anhydrides, preferred are maleic acid and maleic anhydride.

As the method of obtaining the modified polyolefin (B) by graft-copolymerizing the polyolefin with the unsaturated carboxylic acid or anhydride thereof, there my be used various conventionally known methods. For example, there may be used a method of melting the polyolefin using an extruder, etc., and then adding a monomer to be grafted to the molten polyolefin to copolymerize the polyolefin therewith; a method of dissolving the polyolefin in a solvent and then adding a monomer to be grafted to the resulting solution to copolymerize the polyolefin therewith; and a method of suspending the polyolefin in water and then adding a monomer to be grafted to the resulting suspension to copolymerize the polyolefin therewith.

Examples of the thus graft-modified polyolefin (B) include "MODIC AP-P502" and "MODIC AP-P565" (all available from Mitsubishi Chemical Corp.), "ADMER GT6" available from Mitsui Chemical Corp., and "ADTEX DU0500" available from Nippon Polyethylene Co., Ltd.

The modified polyolefin (B) used in the present invention preferably has a melt flow rate (MFR) of from 0.5 to 50 g/10 min as measured at 190° C. under a load of 2.16 kgf. When controlling the MFR of the modified polyolefin (B) to the above specified range, the resulting resin exhibits excellent adhesion property and moldability.

The layer of the barrier resin composition for the multilayer injection molded article I is obtained by mixing the polyamide resin (A), the modified polyolefin (B) and the polyolefin (C) with each other. The barrier resin composition for the multilayer injection molded article I contains 10 to 70% by mass of the polyamide resin (A), 90 to 30% by mass of the modified polyolefin (B) and 0 to 50% by mass of the polyolefin (C), preferably contains 15 to 65% by mass of the component (A), 85 to 35% by mass of the component (B) and 0 to 40% by mass of the component (C), and more preferably contains 20 to 60% by mass of the component (A), 80 to 40% by mass of the component (B) and 0 to 30% by mass of the component (C). When adjusting the content of the component (A) to 10% by mass or more, the resulting resin composition exhibits a sufficient barrier property, and when adjusting the content of the component (A) to 70% by mass or less, the resulting layer exhibits a sufficient adhesion to the adjacent layers. In addition, when adjusting the content of the component (B) to 30% by mass or more, the resulting resin composition exhibits a sufficient adhesion property, and when adjusting the content of the component (B) to 90% by mass or less, the resulting resin composition exhibits a sufficient barrier property. Further, when adjusting the content of the component (C) to 50% by mass or less, the resulting resin composition exhibits a sufficient adhesion property.

The layer of the barrier resin composition for the multilayer injection molded article II is obtained by mixing the polyamide resin (A), the modified polyolefin (B) and the m-xylylene group-free polyamide (D) with each other. The barrier resin composition for the multilayer injection molded article II contains 50 to 90% by mass of the polyamide resin (A), 2 to 45% by mass of the modified polyolefin (B) and 2 to 45% by mass of the m-xylylene group-free polyamide (D), and preferably contains 55 to 85% by mass of the component (A), 5 to 40% by mass of the component (B) and 5 to 40% by mass of the component (D).

The m-xylylene group-free polyamide (D) is preferably softer than the polyamide resin (A). Examples of the m-xylylene group-free polyamide (D) include aliphatic polyamides such as nylon-4, nylon-6, nylon-12, nylon-66, nylon-46, nylon-610, nylon-612 and nylon-666 (copolymer of nylon-6 with nylon-66). Among these aliphatic polyamides, preferred are nylon-6, nylon-66 and nylon-666.

When adjusting the content of the component (A) in the barrier resin composition containing the m-xylylene group-free polyamide (D) to 50% by mass or more, the resulting resin composition exhibits a sufficient barrier property, whereas when adjusting the content of the component (A) in the barrier resin composition containing the m-xylylene group-free polyamide (D) to 90% by mass or less, the resulting layer exhibits a sufficient adhesion to the adjacent layers. In addition, when adjusting the content of the component (B) in the barrier resin composition containing the m-xylylene group-free polyamide (D) to 20% by mass or more, the resulting resin composition exhibits a sufficient adhesion property, whereas when adjusting the content of the component (B) in the barrier resin composition containing the m-xylylene group-free polyamide (D) to 45% by mass or less, the resulting resin composition exhibits a sufficient barrier property.

The m-xylylene group-free polyamide (D) preferably has a relative viscosity of less than 5 and more preferably less than 4 as measured at 25° C. in 96% by mass concentrated sulfuric acid as a solvent with a concentration of 1 g/100 mL. When adjusting the relative viscosity of the m-xylylene group-free polyamide (D) to less than 5, the resulting resin composition is free from problems such as variation in extrusion output or breaking of strands extruded upon being premixed in an extruder.

Meanwhile, the relative viscosity of the m-xylylene group-free polyamide (D) is determined as follows. That is, one gram of the m-xylylene group-free polyamide (D) is accurately weighed, and dissolved in 100 mL of 96% by mass sulfuric acid at a temperature of 20 to 30° C. while stirring. After completely dissolving the m-xylylene group-free polyamide (D) in the acid, 5 cc of the resulting solution is rapidly sampled and placed in a Canon Fenske viscometer. After the viscometer filled with the polyamide solution is allowed to stand in a constant temperature oven maintained at 25° C. for 10 min, a dropping time (t) of the solution is measured. Also, a dropping time ($t_0$) of the 96% by mass sulfuric acid solely is measured. The relative viscosity of the m-xylylene group-free polyamide (D) is calculated from the thus measured dropping times t and $t_0$ according to the following formula:

$$\text{Relative Viscosity}=(t)/(t_0)$$

As described above, the multilayer injection molded articles I and II of the present invention include at least one layer of the barrier resin composition which is preferably sandwiched between of thermoplastic resin layers (F).

The respective thermoplastic resin layers (F) may be formed from various thermoplastic resins, preferably from polyolefins. Examples of the polyolefins used for production of the thermoplastic resin layers (F) between which the layer of the barrier resin composition is sandwiched include linear low-density polyethylene, low-density polyethylene, medium-density polyethylene, high-density polyethylene, ultrahigh molecular weight high-density polyethylene, polypropylene, copolymers of two or more kinds of olefins selected from ethylene, propylene, butene, etc., and mixtures of these compounds. Among these polyolefins, polypropylene is especially preferred because of excellent heat resistance thereof. In addition, the polyolefins for the thermoplastic resin layers (F) may be used in the form of a mixture with the other resins such as elastomers, or a mixture with the other additives such as, for example, carbon black and flame retardants.

The multilayer injection molded articles I and II of the present invention may be produced, for example, in the following manner. Using an injection molding machine having two injection cylinders, the thermoplastic resin and the barrier resin composition are injected from a skin-side injection cylinder and a core-side injection cylinder, respectively, through mold hot runners into a mold cavity to obtain a multilayer body. Further, the thus obtained multilayer injection molded article is subjected to biaxial stretch blow molding to obtain a multilayer stretched injection molded article. The biaxial stretch blow molding of the multilayer injection molded article may be conducted by conventionally known methods. For example, there may be adopted the method in which the multilayer injection molded article is heated to a temperature of 120 to 170° C. as measured on its surface, and then subjected to blow molding. The blow pressure used in the above method is usually from 1 to 4 MPa.

According to the above method, in the step of injecting the thermoplastic resin such as polyolefins which forms innermost and outermost layers through the skin-side injection cylinder and injecting the barrier resin composition which forms the barrier layer through the core-side injection cylinder, the thermoplastic resin is first injected and then the barrier resin composition is injected, and further a necessary amount of the thermoplastic resin is injected to fully fill the mold cavity, thereby producing a multilayer injection molded article having a three-layer structure (thermoplastic resin/ barrier resin composition/thermoplastic resin). Meanwhile, the method of producing the multilayer parison is not particularly limited to the above method.

The average thickness of the respective thermoplastic resin layers (F) in the multilayer injection molded articles I and II is preferably from 0.01 to 3.0 mm. The average thickness of the layer of the barrier resin composition in the multilayer injection molded articles I and II is preferably from 0.005 to 2 mm. The wall thickness of a multilayer container constituted from the multilayer injection molded articles I or II is not necessarily kept constant over an entire part thereof, and the average wall thickness of the multilayer container is usually from 0.01 to 5.0 mm.

The multilayer injection molded articles I and II produced according to the present invention may be respectively subjected to biaxial stretching to obtain a multilayer stretched injection molded article. The biaxial stretching may be conducted using an ordinary blow molding machine.

For example, using a biaxial stretch blow molding machine, the injection molded article heated for a period of from about 15 s to about 55 min using a far infrared heater, etc., is blow-molded using a stretch rod under a pressure of from 0.5 to 3.5 MPa to obtain the multilayer stretched injection molded article.

The multilayer injection molded articles I and II of the present invention may also be produced from a recycled material obtained by re-melting burrs and defective moldings. In this case, from the viewpoint of a good strength of the resulting multilayer injection molded article, the recycled material may be suitably used for layers disposed outside of the layer of the barrier resin composition.

Meanwhile, the respective resin layers may also contain various substances such as lubricants, releasing agents, antioxidants, processing stabilizers, heat stabilizers, ultraviolet absorbers, phyllosilicates, nucleating agents, and inorganic or organic salts and complexes of metals such as Co, Mn and Zn unless the addition thereof adversely affects the aimed effects of the present invention.

The single-layer injection molded article of the present invention is in the form of a molded article containing the polyolefin (C) in which at least a part of the polyamide resin (A) is dispersed in a layered state as described above.

The molded article containing the polyolefin (C) is produced from a mixed polyolefin (E) containing 40 to 100% by mass of the polyolefin (C) and 60 to 0% by mass of the modified polyolefin (B) and preferably containing 50 to 90% by mass of the polyolefin (C) and 10 to 50% by mass of the modified polyolefin (B).

The polyamide (A) used in the single-layer injection molded article of the present invention may also contain other polyamides such as nylon-6, nylon-66 and nylon-666, ethylene-vinyl alcohol copolymer resins, vinyl alcohol-based copolymer resins, acrylonitrile resins, etc., if required.

More specifically, the single-layer injection molded article of the present invention is in the form of a molded article having a single-layer structure which is obtained by melting and mixing the mixed polyolefin (E) and the polyamide resin (A) and then subjecting the resulting mixture to injection molding. The obtained single-layer injection molded article contains 40 to 90% by mass of the mixed polyolefin (E) and 60 to 10% by mass of the polyamide resin (A); preferably contains 50 to 85% by mass of the component (E) and 50 to 15% by mass of the component (A); more preferably contains 55 to 80% by mass of the component (E) and 45 to 20% by mass of the component (A); and still more preferably contains 55 to 75% by mass of the component (E) and 45 to 25% by mass of the component (A) on the basis of a total amount of the components (E) and (A). When adjusting the content of the component (E) in the single-layer injection molded article to 40% by mass or more, the resulting molded article exhibits an excellent strength, whereas when adjusting the content of the component (E) to 90% by mass or less, the resulting molded article exhibits a sufficient barrier property.

The respective resins used for production of the single-layer injection molded article of the present invention may be previously melt-kneaded by an extruder, or may be dry-blended together before injection-molded.

The single-layer injection molded article of the present invention may also be produced by using a conventionally known injection molding machine. The average thickness of a single layer constituting the single-layer injection molded article of the present invention is preferably from 0.1 to 5.0 mm and more preferably from 0.2 to 4 mm.

In the single-layer injection molded article of the present invention, at least a part of the polyamide resin (A) is dispersed therein in a layered state. In particular, it is preferred that the polyamide resin (A) be oriented and dispersed in a layered state in a surface layer portion of the molded article.

In the single-layer injection molded article of the present invention, a recycled material which is obtained by re-melting burrs or defective moldings may be introduced as a recycled layer into the molded article. In this case, it is preferred that the amounts of the respective resins added be suitably adjusted from the viewpoint of a good strength of the resulting molded article.

Meanwhile, the mixed polyolefin (E) or the polyamide resin (A) used in the single-layer injection molded article of the present invention may also contain various substances such as lubricants, releasing agents, antioxidants, processing stabilizers, heat stabilizers, ultraviolet absorbers, phyllosilicates, nucleating agents, and inorganic or organic salts and complexes of metals such as Co, Mn and Zn unless the addition thereof adversely affects the aimed effects of the present invention.

The multilayer injection molded articles I and II and the single-layer injection molded article thus obtained according to the present invention are excellent in gas-barrier property and suitably used as container for storing and preserving various products therein. Examples of the products stored or preserved in these molded articles include liquid beverages such as carbonated beverage, juice, water, milk, sake, whisky, shochu, coffee, tea, jelly beverage and healthy beverage, seasonings such as liquid seasoning, sauce, soy sauce, dressing, liquid soup stock, mayonnaise, miso and grated spices, pasty foodstuffs such as jam, cream and chocolate paste, liquid foodstuffs, typically, liquid processed foodstuffs such as liquid soup, cooked food, pickles and stew, raw or boiled noodles such as buckwheat noodle, wheat noodle and Chinese noodle, uncooked or boiled rice such as polished rice, water-conditioned rice and washing-free rice, processed rice products such as boiled rice mixed with fish and vegetables, rice boiled together with red beans and rice gruel, high water content foodstuffs, typically powdery seasonings such as powdery soup and powdery soup stock, and low water content foodstuffs such as typically dehydrated vegetables, coffee beans, coffee powder, roasted tea, confectioneries made of cereals, as well as solid and solution chemicals such as agricultural chemicals and insecticides, liquid or pasty drugs, beauty wash, cosmetic cream, milky lotion, hair dressing, hair dye, shampoo, soap and detergent.

EXAMPLES

The present invention will be described in more detail below by referring to the following examples, etc. In the following examples, etc, various properties of the polyamide resins (A) and the injection molded articles were measured and evaluated by the following methods.

(1) Relative Viscosity of Polyamide Resin (A)

One gram of the polyamide resin (A) was accurately weighed, and dissolved in 100 mL of 96% by mass sulfuric acid at a temperature of 20 to 30° C. while stirring. After completely dissolving the polyamide resin in the acid, 5 cc of the resulting polyamide solution was rapidly sampled and placed in a Canon Fenske viscometer. After the viscometer filled with the polyamide solution was allowed to stand in a constant temperature oven maintained at 25° C. for 10 min, a dropping time (t) of the solution was measured. Also, a dropping time ($t_0$) of the 96% by mass sulfuric acid solely was measured. The relative viscosity of the polyamide resin (A) was calculated from the thus measured dropping times t and $t_0$ according to the following formula:

Relative Viscosity=$(t)/(t_0)$ (2) Extrudiability of Barrier Resin Composition

The respective resin pellets of the barrier resin composition were dry-blended together, charged into a twin-screw extruder equipped with a strong-kneading type screw having a retention section with reverse kneading elements, and then kneaded and extruded therefrom under the conditions including a temperature of 260° C., an extrusion output of 10 kg/h and a rotating speed of 100 rpm to evaluate an extrusion stability of the resin composition according the following ratings.

a: Stably extruded;
b: Slightly unstable; and
c: Unstable.

(3) Moldability of Multilayer Injection Molded Article

A barrel portion of a multilayer injection molded container was cut to evaluate a uniformity of thickness of a layer of the barrier resin composition according the following ratings.

a: Uniform thickness
b: Slight unevenness in thickness; and
c: Considerable unevenness in thickness.

(4) Delamination Resistance

<Multilayer Injection Molded Article>

A barrel portion of a multilayer injection molded container was cut into an annular sliced piece, and the layer of the barrier resin composition in the sliced piece was peeled off from the outer layer to evaluate a delamination condition thereof according the following ratings.

a: Large resistance to delamination upon peeling;
b: Slight resistance to delamination upon peeling; and
c: No resistance to delamination upon peeling.

<Multilayer Stretched Injection Molded Article>

The multilayer stretched injection molded article was collapsed at its barrel portion three times to observe a delamination condition between the layer of the barrier resin composition and the outer layer by naked eyes and evaluate the delamination condition according the following ratings.

a: No delamination;
b: Slight delamination; and
c: Considerable delamination.

(5) Oxygen-Barrier Property (Oxygen Permeability)

The oxygen permeability of the injection molded container was measured at 23° C. under such an atmosphere in which a relative humidity inside of the container was 60% and a relative humidity outside of the container was 50%, according to ASTM D3985. The measurement was conducted using "OX-TRAN 10/50A" available from Modern Controls Corp.

(6) Heat Resistance of Multilayer Injection Molded Article

The multilayer injection molded container was filled with 20 mL of water, or the multilayer stretched injection molded container was filled with 500 mL of water. After capped, the container was placed in an autoclave available from Tommy Industry, Co., Ltd., and subjected to retort treatment at 90° C. for 30 min. Then, the container was observed by naked eyes to evaluate a degree of deformation of the container according the following ratings.

a: No deformation;
b: Slight deformation; and
c: Considerable deformation.

(7) Dispersing Condition in Single-Layer Injection Molded Article

The resulting single-layer injection molded container was cut along a section thereof, and a dilute iodine available from Tsukishima Yakuhin Co., Ltd., was applied to the section of the container to dye the polyamide therein. Thereafter, the dispersing condition of the polyamide in the resin material of the container was observed using a microscope. The dispersing condition of the polyamide was evaluated as "layered state" in the case where the polyamide was dispersed in the form of a layer in a surface layer portion of the molded article, and as "granulated state" in the case where the polyamide was dispersed in the form of granules as a whole.

Production Process a (Production of Multilayer Injection Molded Article)

Using an injection molding machine "Model M200" (four-shot type) available from Meiki Seisakusho Co., Ltd., a three-layer injection molded article as a parison having a whole length of 95 mm, an outer diameter of 22 mm and a wall thickness of 4.0 mm was produced.

(Molding Conditions for Production of Three-Layer Injection Molded Article)

Skin-side injection cylinder temperature: 240° C.
Core-side injection cylinder temperature: 260° C.
Resin temperature in flow path within mold: 260° C.
Temperature of mold cooling water: 15° C.
Proportion of barrier resin composition in multilayer injection molded container: 20% by mass Production Process B (Production of Multilayer Stretched Injection Molded Article)

The parison in the form of the three-layer injection molded article obtained in the above Production Process A was subjected to biaxial stretch blow molding using a blow molding machine "Model: LB-01" available from KRUPP CORPOLAST CORP., to produce a three-layer stretched injection molded container (bottle) having the following shape.

Shape: whole length: 223 mm; outer diameter: 65 mm; inner capacity: 500 mL; layer structure: polypropylene layer/barrier resin layer/polypropylene layer=0.12 mm/0.06 mm/0.12 mm; bottom shape: champagne type.

(Conditions of Biaxial Stretch Blow Molding)

Parison heating temperature: 160° C.
Blow pressure: 1.5 MPa

Production Process C (Production of Multilayer Injection Molded Container)

Using an injection molding machine "Model M200" (four-shot type) available from Meiki Seisakusho Co., Ltd., a three-layer injection molded article as a parison having a whole length of 95 mm, an outer diameter of 25 mm and a wall thickness of 3.0 mm was produced.

(Molding Conditions for Production of Three-Layer Injection Molded Article)

Skin-side injection cylinder temperature: 240° C.
Core-side injection cylinder temperature: 260° C.
Resin temperature in flow path within mold: 260° C.
Temperature of mold cooling water: 15° C.
Proportion of barrier resin composition in multilayer injection molded article: 10% by mass Production Process D (Production of Single-Layer Injection Molded Container)

Using an injection molding machine "Model M200" (four-shot type) available from Meiki Seisakusho Co., Ltd., a single-layer injection molded article as a parison having a whole length of 95 mm, an outer diameter of 22 mm and a wall thickness of 4.0 mm was produced.

(Molding Conditions for Production of Injection Molded Article)

Skin-side injection cylinder temperature: 240° C.
Core-side injection cylinder temperature: 260° C.
Resin temperature in flow path within mold: 260° C.
Temperature of mold cooling water: 15° C.

Production Example 1

Production of Polyamide Resin:A4

A jacketed 50-L reaction vessel equipped with a stirrer, a partial condenser, a cooler, a dropping tank and a nitrogen gas inlet pipe was charged with 14.2 kg (97.1 mol) of adipic acid and 1.0 kg (6.2 mol) of isophthalic acid which were previously accurately weighed, and then an inside of the reaction vessel was fully purged and replaced with nitrogen. While further flowing a small amount of nitrogen through the reaction vessel, the contents therein were uniformly melted at 160° C. to form a uniform slurry of the molten adipic acid and isophthalic acid. Then, 14.0 kg (102.6 mol) of m-xylylenediamine was continuously dropped into the obtained slurry over 1 h under stirring. During the dropping, an inside temperature of the reaction vessel was continuously raised to 247° C. Water distilled off during the dropping of m-xylylenediamine was discharged out of the reaction system through the partial condenser and the cooler. After completion of dropping the m-xylylenediamine, the inside temperature of the reaction vessel was raised to 260° C. at which the reaction was continued for 1 h. The resultant polymer was withdrawn in the form of strands from the reaction vessel through a nozzle fitted to a lower portion thereof, water-cooled and then cut into pellets.

Next, a heater of a rotary drum type made of stainless steel was charged with the thus obtained pellets, and operated at a rotating speed of 10 rpm. Then, an inside of the reaction vessel was fully purged and replaced with nitrogen, and while further flowing a small amount of nitrogen through the reaction vessel, the temperature inside of the reaction system was raised from room temperature to 150° C. When the temperature inside of the reaction system reached 150° C., the pressure of the reaction system was reduced to 1 Torr or less, and the temperature inside of the reaction system was further raised to 210° C. over 110 min. From the time at which the temperature inside of the reaction system reached 210° C., the reaction was continued at the same temperature for 180 min. After completion of the reaction, the pressure reduction was terminated, and the temperature inside of the reaction system was decreased under a nitrogen gas flow. When reaching 60° C., the pellets were withdrawn from the heater, thereby obtaining a polyamide resin: A4. As a result, it was confirmed that the thus obtained polyamide resin: A4 had a relative viscosity of 2.7 and a melting point of 232° C.

Examples 1 to 3 and Comparative Examples 1 to 3

Using the materials shown in Table 1, a multilayer molded container (parison) having a three-layer structure was produced by the above Production Process A to evaluate a delamination resistance, an oxygen-barrier property and a heat resistance thereof. The results are shown in Table 1. Meanwhile, the multilayer molded containers obtained in Comparative Examples 2 and 3 easily suffered from delamination between the barrier resin composition layer and the adjacent layers, and were therefore not subjected to evaluation of an oxygen-barrier property and a heat resistance thereof.

Examples 4 to 7 and Comparative Examples 4 and 5

Using the materials shown in Table 2, a multilayer stretched molded container (bottle) having a three-layer structure was produced by the above Production Process B to evaluate a delamination resistance, an oxygen-barrier property and a heat resistance thereof. The results are shown in Table 2.

Examples 8 to 12 and Comparative Examples 6 to 9

Using the materials shown in Table 3, a multilayer molded container (parison) having a three-layer structure was produced by the above Production Process C to evaluate an extrudability, a moldability, a delamination resistance, an oxygen-barrier property and a heat resistance thereof. The results are shown in Table 3. Meanwhile, the multilayer molded container obtained in Comparative Example 7 easily suffered from delamination between the barrier resin composition layer (intermediate layer) and the adjacent layers, and was therefore not subjected to evaluation of an oxygen-barrier property and a heat resistance thereof.

Examples 13 to 19 and Comparative Examples 10 and 11

Using the materials shown in Table 4, a single-layer injection molded container (parison) was produced by the above Production Process D to evaluate a dispersibility and an oxygen-barrier property thereof. The results are shown in Table 4.

TABLE 1

|  | Examples | | | Comparative Examples | | |
|---|---|---|---|---|---|---|
|  | 1 | 2 | 3 | 1 | 2 | 3 |
| Structure of multilayer injection molded article (3-layered) (% by mass) Inner layer and outer layer (polyolefin) | | | | | | |
| C1 (NOVATEC PP-MG03E) | 100 | 100 | 100 | 100 | 100 | 100 |
| Intermediate layer (barrier resin composition) (Polyamide resin) | | | | | | |
| A1 (MX NYLON S6121) | 40 | 50 | 40 | | 100 | |
| A2 (MX NYLON S6007) | | | | | | |
| A3 (MX NYLON S6001) | | | | | | 80 |
| A4 (Production Example 1) | | | | | | |

TABLE 1-continued

|  | Examples | | | Comparative Examples | | |
|---|---|---|---|---|---|---|
|  | 1 | 2 | 3 | 1 | 2 | 3 |
| (Modified polyolefin) | | | | | | |
| B1 (MODIC AP-P502) | 60 | 50 | 50 | | | |
| B2 (MODIC AP-P565) | | | | | | 20 |
| (Polyolefin) | | | | | | |
| C2 (NOVATEC PP-M06A) | | | 10 | 100 | | |
| Evaluation of multilayer injection molded article (3-layered) | | | | | | |
| (4) Delamination resistance | a | a | a | a | c | c |
| (5) Oxygen-barrier property: oxygen permeability (cc/bottle · day · 0.21 atm) | 0.018 | 0.005 | 0.017 | 0.042 | — | — |
| (6) Heat resistance | a | a | a | a | — | — |

TABLE 2

|  | Examples | | | | Comparative Examples | |
|---|---|---|---|---|---|---|
|  | 4 | 5 | 6 | 7 | 4 | 5 |
| Structure of multilayer stretched injection molded article (3-layered) (% by mass) Inner layer and outer layer (polyolefin) | | | | | | |
| C1 (NOVATEC PP-MG03E) | 100 | 100 | 100 | 100 | 100 | 100 |
| Intermediate layer (barrier resin composition) (Polyamide resin) | | | | | | |
| A1 (MX NYLON S6121) | | | | | | |
| A2 (MX NYLON S6007) | | | | | | |
| A3 (MX NYLON S6001) | | | | | | |
| A4 (Production Example 1) | 60 | 40 | 20 | 10 | | |
| (Modified polyolefin) | | | | | | |
| B1 (MODIC AP-P502) | | | | | | |
| B2 (MODIC AP-P565) | 40 | 30 | 80 | 90 | | 95 |
| (Polyolefin) | | | | | | |
| C1 (NOVATEC PP-MG03E) | | 30 | | | 100 | |
| Evaluation of multilayer stretched injection molded article (3-layered) | | | | | | |
| (4) Delamination resistance | a | a | a | a | a | a |
| (5) Oxygen-barrier property: oxygen permeability (cc/bottle · day · 0.21 atm) | 0.1 | 0.3 | 1.2 | 1.4 | 2.0 | 1.6 |
| (6) Heat resistance | a | a | a | a | a | a |

TABLE 3

|  | Examples | | | | |
|---|---|---|---|---|---|
|  | 8 | 9 | 10 | 11 | 12 |
| Structure of multilayer injection molded article (3-layered) (% by mass) Inner layer and outer layer (polyolefin) | | | | | |
| C1 (NOVATEC PP-MG03E) | 100 | 100 | 100 | 100 | 100 |
| Intermediate layer (barrier resin composition) (Polyamide resin) | | | | | |
| A1 (MX NYLON S6121) | 70 | 70 | | | |
| A4 (Production Example 1) | | | 70 | 70 | 60 |
| (Modified polyolefin) | | | | | |
| B2 (MODIC AP-P565) | 20 | 10 | 20 | 20 | 20 |
| (Polyolefin) | | | | | |
| C1 (NOVATEC PP-MG03E) | | | | | |
| (m-Xylylene group-free polyamide resin) | | | | | |
| D1 (UBE NYLON-1030B) | 10 | 20 | 10 | | 20 |
| D2 (UBE NYLON-1024B) | | | | 10 | |
| Evaluation of multilayer injection molded article (3-layered) | | | | | |
| (2) Extrudability | b | b | b | a | b |
| (3) Moldability | a | a | a | a | a |
| (4) Delamination resistance | a | b | a | a | a |
| (5) Oxygen-barrier property: oxygen permeability (cc/bottle · day · 0.21 atm) | 0.004 | 0.007 | 0.009 | 0.010 | 0.011 |
| (6) Heat resistance | a | a | a | a | a |

TABLE 3-continued

|  | Comparative Examples | | | |
|---|---|---|---|---|
|  | 6 | 7 | 8 | 9 |

Structure of multilayer injection molded article (3-layered) (% by mass)
Inner layer and outer layer (polyolefin)

| | | | | |
|---|---|---|---|---|
| C1 (NOVATEC PP-MG03E) | 100 | 100 | 100 | 100 |

Intermediate layer (barrier resin composition) (Polyamide resin)

| | | | | |
|---|---|---|---|---|
| A1 (MX NYLON S6121) | 80 | 100 | | |
| A4 (Production Example 1) (Modified polyolefin) | | | | 20 |
| B2 (MODIC AP-P565) (Polyolefin) | 20 | | | 20 |
| C1 (NOVATEC PP-MG03E) (m-Xylylene group-free polyamide resin) | | | 100 | |
| D1 (UBE NYLON-1030B) | | | | |
| D2 (UBE NYLON-1024B) | | | | 60 |

Evaluation of multilayer injection molded article (3-layered)

| | | | | |
|---|---|---|---|---|
| (2) Extrudability | c | a | a | a |
| (3) Moldability | c | a | a | b |
| (4) Delamination resistance | a | c | a | a |
| (5) Oxygen-barrier property: oxygen permeability (cc/bottle · day · 0.21 atm) | 0.014 | — | 0.052 | 0.020 |
| (6) Heat resistance | a | — | a | a |

TABLE 4

|  | Examples | | | | |
|---|---|---|---|---|---|
|  | 13 | 14 | 15 | 16 | 17 |

Composition of single-layer injection molded article (% by mass)
(Polyamide resin)

| | | | | | |
|---|---|---|---|---|---|
| A1 (MX NYLON S6121) | | | | | |
| A2 (MX NYLON S6007) | | | | | 40 |
| A3 (MX NYLON S6001) | 25 | 20 | 30 | 45 | |
| A4 (Production Example 1) (Modified polyolefin) | | | | | |
| B3 (ADMER GT6) | 10 | 15 | 15 | 15 | 10 |
| B4 (MODIC AP-P502) (Polyolefin) | | | | | |
| C3 (NOVATEC HD-HB431) | 65 | | | | |
| C4 (NOVATEC HD-HY540) | | 65 | 55 | 40 | |
| C5 (NOVATEC HD-HJ580) | | | | | 50 |
| C6 (NOVATEC PP-FY6) | | | | | |

TABLE 4-continued

Evaluation of single-layer injection molded article

| | | | | | |
|---|---|---|---|---|---|
| (5) Oxygen-barrier property: oxygen permeability (cc/bottle · day · 0.21 atm) | 0.0015 | 0.0090 | 0.0023 | 0.0003 | 0.0069 |
| (7) Dispersing condition | Layered | Layered | Layered | Layered | Layered |

|  | Examples | | Comparative Examples | |
|---|---|---|---|---|
|  | 18 | 19 | 10 | 11 |

Composition of single-layer injection molded article (% by mass)
(Polyamide resin)

| | | | | |
|---|---|---|---|---|
| A1 (MX NYLON S6121) | 45 | | | |
| A2 (MX NYLON S6007) | | | | |
| A3 (MX NYLON S6001) | | 25 | | 10 |
| A4 (Production Example 1) (Modified polyolefin) | | | | |
| B3 (ADMER GT6) | 15 | | | 20 |
| B4 (MODIC AP-P502) (Polyolefin) | | 10 | | |
| C3 (NOVATEC HD-HB431) | | | 100 | |
| C4 (NOVATEC HD-HY540) | | | | 70 |
| C5 (NOVATEC HD-HJ580) | 40 | | | |
| C6 (NOVATEC PP-FY6) | | 65 | | |

Evaluation of single-layer injection molded article

| | | | | |
|---|---|---|---|---|
| (5) Oxygen-barrier property: oxygen permeability (cc/bottle · day · 0.21 atm) | 0.0086 | 0.0021 | 0.029 | 0.025 |
| (7) Dispersing condition | Layered | Layered | — | Granulated |

Meanwhile, the meanings of the symbols appearing in Tables 1 to 4 are as follows.
(Polyamide Resin)
A1: Polyamide MXD6 having a relative viscosity of 3.8 ("MX NYLON 56121" available from Mitsubishi Gas Chemical Co., Inc.; polyamide resin produced from m-xylylenediamine and adipic acid)
A2: Polyamide MXD6 having a relative viscosity of 2.6 ("MX NYLON S6007" available from Mitsubishi Gas Chemical Co., Inc.; polyamide resin produced from m-xylylenediamine and adipic acid)
A3: Polyamide MXD6 having a relative viscosity of 2.1 ("MX NYLON S6001" available from Mitsubishi Gas Chemical Co., Inc.; polyamide resin produced from m-xylylenediamine and adipic acid)
A4: Polyamide resin obtained in Production Example 1
(Modified Polyolefin)
B1: "MODIC AP-P502" (available from Mitsubishi Chemical Corp.; MFR=1.3; density=0.89)
B2: "MODIC AP-P565" (available from Mitsubishi Chemical Corp.; MFR=5.7; density=0.89)
B3: "ADMER GT6" (available from Mitsui Chemical Corp.; MFR=0.9)
B4: "MODIC AP-P502" (available from Mitsubishi Chemical Corp.; MFR=1.3)
(Polyolefin)
C1: "NOVATEC MG03E" (polypropylene available from Nippon Polypro Co., Ltd.; random polymer; MFR=30)

C2: "NOVATEC PP-M06A" (homopolypropylene available from Nippon Polypro Co., Ltd.; MFR=60)
C3: "NOVATEC HD-HB431" (polyethylene available from Nippon Polyethylene Co., Ltd.; MFR=0.35; density: 0.96)
C4: "NOVATEC HD-HY540" (polyethylene available from Nippon Polyethylene Co., Ltd.; MFR=1.0; density: 0.96)
C5: "NOVATEC HD-HJ580" (polyethylene available from Nippon Polyethylene Co., Ltd.; MFR=12; density: 0.96)
C6: "NOVATEC PP-FY6" (polypropylene available from Nippon Polypro Co., Ltd.; MFR=2.5; density=0.90)
(m-Xylylene Group-Free Polyamide)
D1: "UBE NYLON-1030B" (nylon-6 available from Ube Kosan Co., Ltd.; relative viscosity=4.1)
D2: "UBE NYLON-1024B" (nylon-6 available from Ube Kosan Co., Ltd.; relative viscosity=3.5)

Industrial Applicability

The multilayer injection molded articles I and II of the present invention are excellent in barrier property, delamination resistance, heat resistance and appearance, in particular, is prevented from suffering from delamination between a barrier resin layer and adjacent layers even when exposed to severe impact upon transportation or drop thereof, are capable of avoiding occurrence of the delamination even though they are not formed into such a shape having less irregular and flexed portions, and therefore exhibit a large freedom of design. The single-layer injection molded article of the present invention is excellent in barrier property and appearance, and can be produced in an economically advantageous manner.

Therefore, the multilayer injection molded articles I and II and the single-layer injection molded article are suitably used as containers for liquid food such as beverages and soups or for food and drugs capable of being subjected to retort treatment, etc.

The invention claimed is:

1. A method of providing an oxygen barrier for a product, comprising:
placing a product in an injection molded article which comprises 10 to 60% by mass of a polyamide resin (A) and 40 to 90% by mass of a mixed polyolefin (E),
wherein the polyamide resin (A) comprises a diamine unit 70 mol % or more of which is m-xylylenediamine and a dicarboxylic acid unit 70 mol % or more of which is one or more dicarboxylic acids comprising a $C_4$ to $C_{20}$ $\alpha,\omega$-linear aliphatic dicarboxylic acid and isophthalic acid at a molar ratio of from 30:70 to 100:0,
the mixed polyolefin (E) comprises 40 to 90% by mass of a polyolefin (C) and 10 to 60% by mass of a modified polyolefin (B), and
at least a portion of the polyamide resin (A) is dispersed in a layered state in the injection molded article,
wherein the injection molded article is a single-layer injection molded container comprising a gas barrier layer.

2. The method of claim 1, wherein the modified polyolefin (B) is obtained by graft-modifying the polyolefin (C) with an unsaturated carboxylic acid or an anhydride thereof.

3. The method of claim 1, wherein the mixed polyolefin (E) comprises 50 to 90% by mass of the polyolefin (C) and 10 to 50% by mass of the modified polyolefin (B).

4. The method of claim 3, wherein the modified polyolefin (B) is obtained by graft-modifying polypropylene with maleic acid or maleic anhydride.

5. A method of providing an oxygen barrier for a product, comprising:
placing a product in an injection molded article which comprises 10 to 60% by mass of a polyamide resin (A) and 40 to 90% by mass of a mixed polyolefin (E),
wherein the polyamide resin (A) comprises a diamine unit 70 mol % or more of which is m-xylylenediamine and a dicarboxylic acid unit 70 mol % or more of which is one or more dicarboxylic acids comprising a $C_4$ to $C_{20}$ $\alpha,\omega$-linear aliphatic dicarboxylic acid and isophthalic acid at a molar ratio of from 30:70 to 100:0,
the mixed polyolefin (E) comprises 40 to 90% by mass of a polyolefin (C) and 10 to 60% by mass of a modified polyolefin (B),
at least a portion of the polyamide resin (A) is dispersed in a layered state in the injection molded article,
the injection molded article is a single-layer injection molded article, and the portion of the polyamide resin (A) is dispersed in a surface portion of the single-layer injection molded article.

6. The method of claim 1, wherein the polyamide resin (A) has a relative viscosity of 2.5 or less as measured at 25° C. in 96% by mass concentrated sulfuric acid as a solvent with a concentration of 1 g/100 mL.

7. The method of claim 1, wherein the polyamide resin (A) has a melting point in a range of from 160 to 240° C.

8. The method of claim 1, wherein the polyamide resin (A) has a melting point in a range of from 180 to 230° C.

9. A method of providing an oxygen barrier for a product, comprising:
placing a product in an injection molded article which comprises 10 to 60% by mass of a polyamide resin (A) and 40 to 90% by mass of a mixed polyolefin (E),
wherein the polyamide resin (A) comprises a diamine unit 70 mol % or more of which is m-xylylenediamine and a dicarboxylic acid unit 70 mol % or more of which is one or more dicarboxylic acids comprising a $C_4$ to $C_{20}$ $\alpha,\omega$-linear aliphatic dicarboxylic acid and isophthalic acid at a molar ratio of from 30:70 to 100:0,
the mixed polyolefin (E) comprises 40 to 90% by mass of a polyolefin (C) and 10 to 60% by mass of a modified polyolefin (B),
at least a portion of the polyamide resin (A) is dispersed in a layered state in the injection molded article, and
the polyamide resin (A) comprises an end amino group at a concentration in a range of from 10 to 30 µ-equivalent/g.

10. The method of claim 1, wherein the polyamide resin (A) comprises at least one phosphorus compound comprising at least one of an alkali metal and an alkaline earth metal.

11. The method of claim 10, wherein the at least one phosphorus compound comprises a hypophosphite of at least one of the alkali metal and the alkaline earth metal.

12. The method of claim 11, wherein the polyamide resin (A) comprises the at least one phosphorus compound at a concentration of 100 ppm or less in terms of phosphorus atom.

13. The method of claim 1, wherein the polyamide resin (A) further comprises at least one polyamide selected from the group consisting of nylon-6, nylon-66 and nylon-666.

14. The method of claim 1, wherein the injection molded article is produced by a production method comprising: mixing the mixed polyolefin (E) and the polyamide resin (A) to obtain a mixture; melting the mixture; and subjecting the mixture to injection molding.

15. The method of claim 14, wherein the production method of the injection molded article further comprises drying the polyamide resin (A) before being mixed with the mixed polyolefin (E).

16. The method of claim 15, wherein the drying of the polyamide resin (A) causes a water content in the polyamide resin (A) to be 0.10% by mass or less.

17. The method of claim 16, wherein the drying of the polyamide resin (A) causes the water content in the polyamide resin (A) to be 0.05% by mass or less.

18. The method of claim 1, wherein the molar ratio of the $C_4$ to $C_{20}$ α,ω-linear aliphatic dicarboxylic acid to isophthalic acid is from 30:70 to 95:5.

19. The method of claim 1, wherein the molar ratio of the $C_4$ to $C_{20}$ α,ω-linear aliphatic dicarboxylic acid to isophthalic acid is from 60:40 to 90:10.

20. The method of claim 1, wherein the polyamide resin (A) comprises an end amino group at a concentration in a range of from 10 to 40 μ-equivalent/g.

* * * * *